FACSIMILE RECORDER
Filed May 18, 1964
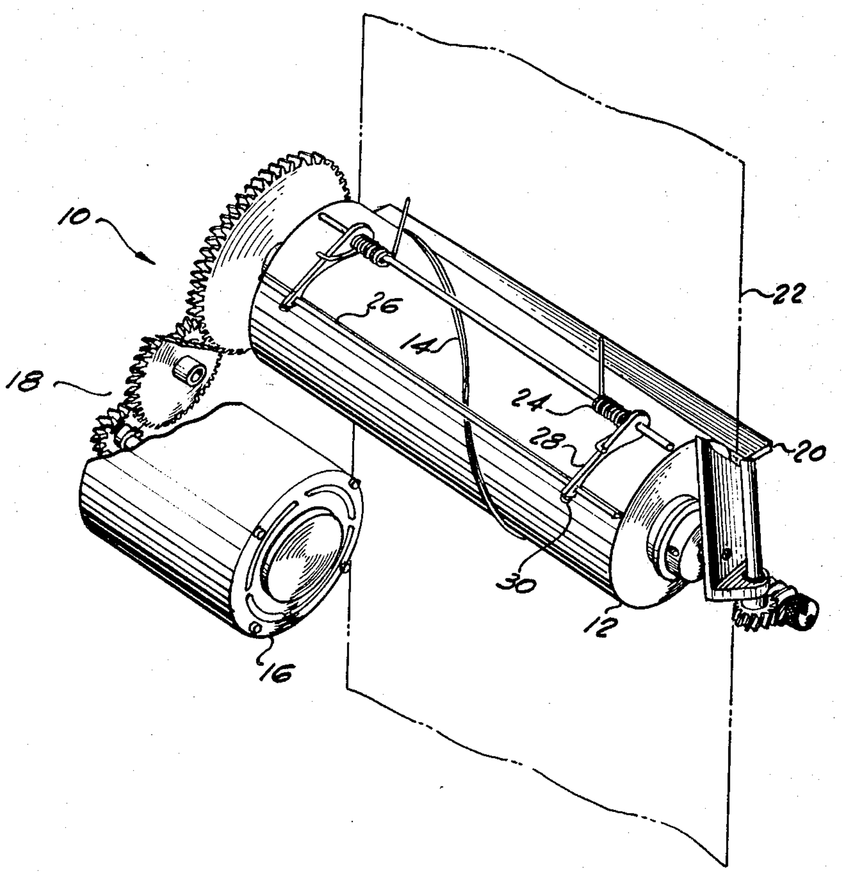
INVENTORS
Eugene F. Barnes
Antoni F. Pendzich
By William J. Newman
Attorney 3,335,221

FACSIMILE RECORDER

Eugene F. Barnes, Arlington Heights, and Antoni F. Pendzich, Chicago, Ill., assignors to Stewart-Warner Corporation, Chicago, Ill., a corporation of Virginia Filed May 18, 1964, Ser. No. 367,982
4 Claims. (Cl. 178—7.6)

ABSTRACT OF THE DISCLOSURE

Apparatus for maintaining the electrodes of a facsimile recorder free from contamination from the fibrous electrolytically recording media including means for wiping one of the electrodes with a silicon fluid.

This invention relates to facsimile receivers and more particularly to the recorder mechanism for facsimile receivers of the type in which copy is reproduced on a recording medium responsive to electric signals indicative of a document being scanned at a facsimile transmitter.

In most facsimile systems the image is reproduced at the receiver recorder on a specially treated recording medium. It is usually a fibrous backing material such as paper which is coated with electrically reactive chemicals such as the type shown in Patent No. 2,358,839 issued to E. R. Hogan on Sept. 26, 1944. This paper was especially adapted to be used in a receiver of the type in which the paper passes between a linear stationary electrode and a helix electrode mounted on a rotating drum. The electrical potential between the electrodes causes a current to pass through the moist paper and produce a reaction with the chemicals therein. The chemical reaction causes a metallic particle from at least one of the electrodes to be deposited and fixed on the paper. The current intensity, determines the density of the mark produced on the paper, and, hence, an accurate reproduction of a document may be made with the marking tones ranging ideally from black to white.

The paper fibers as well as the chemical coating on the moist paper webbing has always been a troublesome feature in the above-described type of facsimile system. The helix drum and the linear electroode being in constant sliding contact with the paper causes deposits to be made theron which render the recorder inefficient, if not inoperable. The chemical coating and the fibers can build up to a point wherein contact between the metal electrodes and the moist paper is blocked and the flow of electricity is disrupted through the paper. The mark on the paper may be lighter than usual or even nonexistent at the location of the deposited material.

The deposit problem becomes especially prevalent in high speed system. In fact, the applicants have found that the solution of this problem has meant the difference between failure and success in the proper operation of a facsimile system which operates at a speed of 900 lines per minute.

It is, therefore, an object of this invention to provide a solution to the well known and long felt problem of paper fiber and chemical deposits on the mechanical scanning portions of a facsimile record.

It is also an object of this invention to provide an economical means and method for preventing the adhesion of paper fibers and chemicals on the scanning electrodes of a facsimile recorder mechanism.

Other objects and advantages of this invention will be steadily apparent upon a further reading of this specification. The attached drawing includes a perspective view of the recording mechanism of a facsimile system including the apparatus for carrying out the teachings of this invention.

Briefly, this invention includes the means and method by which paper fiber and chemicals are prevented from adhering on the recording apparatus wherein at least one of the electrodes is readily supplied with a dimethyl silicone fluid. Applicants have found that the use of silicone fluids is ideal for the purposes involved. It is, of course, well known that these fluids will not freeze or boil off during the ordinary operating temperatures which can be expected and also that they don't stain, have no color and are not toxic. In fact they are widely used in cosmetics for these reasons. In addition, they are relatively inert to chemical reaction and do not readily oxidize, thereby reducing the tendency to break down and cause gumming up of the recorder mechanism. Probably the most important reason, the dimethyl silicone fluids prove so successful in the present application is that they have a tendency to repel other materials. The silicone fluids are extensively used in the household and automobile cleaning industry because of the dirt barrier they provide.

However, even in view of the well established attributes of the dimethyl silicone fluids, they have never been applied to the particular function herein now prescribed for them. That is, they have never been used, to the best of applicants' knowledge, in an electrical system such as recording apparatus for maintaining electric current carrying electrodes free of materials which will impede the flow of electric current. In fact, the use of silicone fluids as dielectrics in capacitors and the like are well established. Even though silicon has been in extensive use for ten years or more to take advantage of one or more of the above listed attributes, and even though the facsimile receivers of the above described type have been in wide spread use for many years, no one has resorted to the use of dimethyl silicone fluids to eliminate the fiber and chemical deposit problems.

Perhaps this failure can be attributed to the fact that the dimethyl silicone fluids have been widely known and extensively used as dielectric materials in capacitors and the like because they have exceedingly good insulating properties. In spite of this, applicants' have found that a thin film of the fluid maintained by a saturated pad or the like on the recording electrode passes a sufficient electric current signal to provide the recording mark. Its foreign matter repellent nature prevents the accumulation of paper fiber and chemical deposits, and its nontoxic and nonstaining nature renders it nonharmful for the prescribed use.

Reference is now made to the figure in the drawing for an illustration of the apparatus to maintain a film of the dimethyl silicone fluid on the recording electrodes. The recording mechanism 10 comprises a drum 12 upon which a helix electrode 14 is mounted. The drum 12 is caused to rotate by means of a synchronous motor 16 through a gear train 18. The helix electrode 14 cooperates with the linear printer bar 20 to mark the paper 22 passing therebetween in accordance with the strength of the electric signal current. The chemicals in the coating on the paper as well as the paper fiber causes deposits on the electrodes and especially along the helix electrode 14 on the rotating drum 12 so as to disrupt the flow of electric current through the paper 20. A spring loaded mechanism 24 supports a fielt pad 26 in a removable manner as indicated by the brackets 28 and thumb screws 30. The pad 26 carries the dimethyl silicone fluid and it is in constant contact with a helix electrode 14 so as to provide a protective dirt resistent film thereon. In addition the silicone fluid has a lubricant like quality which prevents the felt pad from wearing down at an economical rate. The pad may be filled by hand saturation at periodic intervals or automatic means may be provided for removing the supply of the silicone fluid.

As indicated, the dimethyl silicone fluids having the formula $$\left(-\overset{\displaystyle CH_3}{\underset{\displaystyle CH_3}{\overset{|}{\underset{|}{Si}}}}-O\right)_x$$

are of particular interest, but silicone fluids of the phenyl, glycon and vinyl groups are also useful. The dimethyl silicone fluids are prepared in viscosities ranging from 0.65 centistoke to 1,000,000 centistokes by Dow Corning Corp. under their listing as "200 Fluids" and by General Electric as "G. E. Silicone Oils." A silicone fluid having a viscosity of approximately 3,000 centistokes is preferred for the stated purposes, but any one of the above mentioned silicone oils may be used if the viscosity is properly adjusted by means of a thinner or a silicone of lighter viscosity.

It is recognized that although one embodiment of the apparatus of this invention has been discussed herein many modifications may be made thereto without departing from the spirit of this invention. It is, therefore, applicants' intention to be restricted only by the scope of the appending claims.

What is claimed is:

1. In a facsimile recorder of the type having a rotating helix electrode in operative cooperation with a linear stationary electrode to provide a linear sweep across a chemically treated recording medium and produce electrical signals for marking said paper, apparatus for maintaining said electrodes free of fibers and chemicals from said paper comprising, a felt pad, bracket means for maintaining said pad in constrained engagement with said rotating helix electrode, and a dimethyl polysiloxane fluid saturating said felt pad.

2. In combination with a facsimile receiver having a pair of electrodes in contact with a chemically treated fibrous recording media, said electrodes providing an electric current through said media to produce a mark in accordance with received signals, means for maintaining said electrodes free from chemicals and fibers from said media including a pad saturated with a dimethyl polysiloxane fluid in sweeping contact with one of said electrodes.

3. In a facsimile recorder of the type having a rotating helix electrode in operative cooperation with a linear stationary electrode to provide a linear sweep across a chemically treated recording medium and produce electrical signals for marking said paper, apparatus for maintaining said electrodes free of fibers and chemicals from said paper comprising, a felt pad, bracket means for maintaining said pad in constrained engagement with said rotating helix electrode, and a silicone polysiloxane fluid saturating said felt pad.

4. In combination with a facsimile receiver having a pair of electrodes in contact with a chemically treated fibrous recording media, said electrodes providing an electric current through said media to produce a mark in accordance with received signals, means for maintaining said electrodes free from chemicals and fibers from said media including a pad saturated with a dimethyl silicone fluid in sweeping contact with one of said electrodes.

References Cited

UNITED STATES PATENTS

| | | | |
|---|---|---|---|
| 2,785,943 | 3/1957 | Turano | 346—101 |
| 2,955,047 | 10/1960 | Terry | 106—3 |

FOREIGN PATENTS

| | | |
|---|---|---|
| 713,233 | 8/1954 | Great Britain. |

JOHN W. CALDWELL, *Acting Primary Examiner.*

J. A. ORSINO, *Assistant Examiner.*